US009420532B2

(12) United States Patent
Luo et al.

(10) Patent No.: US 9,420,532 B2
(45) Date of Patent: Aug. 16, 2016

(54) SHAPING DATA PACKET TRAFFIC (75) Inventors: Sai Luo, Beijing (CN); Shanshan Zheng, Beijing (CN); Li Shang, Beijing (CN); Xin Zhou, Beijing (CN); Chunxiao Lin, Beijing (CN); Sun Chan, Fremont, CA (US)

(73) Assignee: INTEL CORPORATION, Santa Clara, CA (US)

( * ) Notice: Subject to any disclaimer, the term of this patent is extended or adjusted under 35 U.S.C. 154(b) by 92 days.

(21) Appl. No.: 13/976,110

(22) PCT Filed: Dec. 29, 2011

(86) PCT No.: PCT/CN2011/084903
§ 371 (c)(1),
(2), (4) Date: Jun. 26, 2013

(87) PCT Pub. No.: WO2013/097140
PCT Pub. Date: Jul. 4, 2013

(65) Prior Publication Data
US 2014/0029500 A1    Jan. 30, 2014

(51) Int. Cl.
*H04W 52/02* (2009.01)
(52) U.S. Cl.
CPC ...... *H04W 52/0209* (2013.01); *H04W 52/0216* (2013.01); *Y02B 60/50* (2013.01)
(58) Field of Classification Search
CPC ............ H04W 52/0209; H04W 52/0232; H04W 28/06; H04W 52/0216; H04L 12/10; H04L 65/608; H04L 47/15; H04L 1/0002; Y02B 60/50
USPC ......................................... 370/311, 230, 328
See application file for complete search history.

(56) References Cited

U.S. PATENT DOCUMENTS

| RE44,435 E | * | 8/2013 | Jeong | ...................... H04L 12/10 370/252 |
| 2004/0264396 A1 | * | 12/2004 | Ginzburg | .......... H04W 52/0232 370/311 |
| 2005/0037751 A1 | * | 2/2005 | Kim et al. | .................. 455/432.1 |

(Continued)

FOREIGN PATENT DOCUMENTS

| CN | 1898900 A | 1/2007 |
| CN | 101079643 A | 11/2007 |

(Continued)

OTHER PUBLICATIONS

"Notification Concerning Transmittal of International Preliminary Report on Patentability Chapter 1 of the Patent Cooperation Treaty", Jul. 10, 2014, for International Application No. PCT/CN2011/084903, 6pgs.

(Continued)

*Primary Examiner* — Chi H Pham
*Assistant Examiner* — Shailendra Kumar
(74) *Attorney, Agent, or Firm* — Buckley, Maschoff & Talwalkar LLC (57) ABSTRACT

According to some embodiments, a communication module 120 may be configured to transmit data packet traffic and a management module 110 may be configured to shape the data packet traffic transmitted by the communication module 120. The management module 110 may shape the data packet traffic by buffering data packets routed at different times to the communication module 120 based on at least one power management factor.

17 Claims, 5 Drawing Sheets

(56) References Cited

U.S. PATENT DOCUMENTS

| | | | | |
|---|---|---|---|---|
| 2007/0189235 | A1* | 8/2007 | Chandra | H04L 1/0002 370/335 |
| 2008/0069138 | A1* | 3/2008 | Acharya | H04J 3/0632 370/468 |
| 2010/0228875 | A1* | 9/2010 | Myers | H04L 65/608 709/231 |
| 2010/0265861 | A1 | 10/2010 | He et al. | |
| 2011/0235512 | A1* | 9/2011 | Yuki | H04L 47/14 370/230.1 |
| 2011/0276699 | A1* | 11/2011 | Pedersen | H04L 45/24 709/227 |
| 2012/0093136 | A1* | 4/2012 | Julian | H04W 88/08 370/336 |
| 2012/0140623 | A1* | 6/2012 | Song et al. | 370/230.1 |
| 2012/0327775 | A1* | 12/2012 | Han | H04L 47/15 370/236 |
| 2013/0114485 | A1* | 5/2013 | Vannithamby | H04W 28/06 370/311 |

FOREIGN PATENT DOCUMENTS

| | | | |
|---|---|---|---|
| GB | WO 2011/055131 A1 * | 12/2011 | |
| WO | 2010/102836 A1 | 9/2010 | |
| WO | 2011055131 A1 | 5/2011 | |

OTHER PUBLICATIONS

"PCT Notification of Transmittal of the International Search Report and the Written Opinion of the International Searching Authority, or the Declaration", dated Oct. 4, 2012, for International Application No. PCT/CN2011/084903, 10pgs.

"Communication re Supplementary European Search Report" dated Jul. 27, 2015, issued by the European Patent Office in EP Application No. 11878933.8, 8 pages.

* cited by examiner

SHAPING DATA PACKET TRAFFIC

BACKGROUND

With more electronic devices relying on battery power, electrical power consumption is becoming a more important criterion in the design of electronic devices. Wireless connections in electronic devices, such as connections using a wireless network, cellular network, BLUETOOTH, or other wireless connection, in some instances, may consume a significant portion of the total electrical power used by an electronic device. For example, the electrical power used by a smartphone may double when communicating over a wireless network, such as a local area network that communicates using the Institute of Electrical and Electronics Engineers (IEEE) 802.11n (2009) standard.

Furthermore, as wireless connections become more commonplace, electronic devices may send and receive an increasing amount of data over wireless connections. This increased use of wireless connections may further increase the total power requirements of an electronic device.

DETAILED DESCRIPTION

Figure 1:
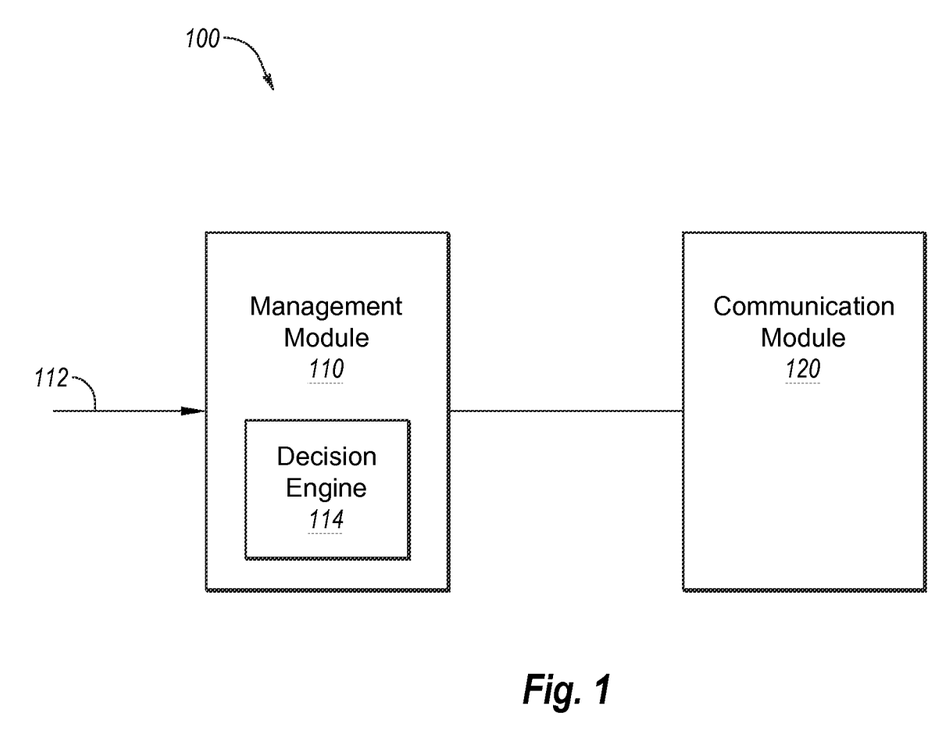
FIG. 1 is a block diagram of an example system, according to some embodiments.

FIG. 1 is a block diagram of an example system 100 according to some embodiments. The system 100 includes a management module 110 that is coupled to a communication module 120. The communication module 120 may be configured to transmit data packets. Electrical power consumption when transmitting data packets by the communication module 120 may depend on the speed of the transmission and the number of transmission requests completed. For example, in some embodiments, the electrical power required by the communication module 120 to transmit data may be reduced by lowering the speed of the transmission. Similarly, in some embodiments, the electrical power required to transmit a given amount of data may be reduced by performing one large data transfer rather than multiple separate smaller data transfers. In some embodiments, the electrical power required to receive data may be reduced by receiving a large data transfer rather than multiple separate smaller data transfers.

In some embodiments, the electrical power savings may be greater to transmit one large data transfer at a higher speed than multiple separate data transfers at lower speeds. In these and other embodiments, the electrical power savings for wireless data transfers may be even greater than for other types of data transfers. Thus, if a data packet traffic shape transmitted by the communication module 120 was adjusted so that the communication module 120 transmits data packets together in a large data transfer, instead of multiple smaller transfers of one or more data packets, the electrical power consumed by the communication module 120 to transmit the data may be reduced. Alternately or additionally, if an incoming data packet traffic shape is altered so that the incoming data arrives in a large data transfer instead of multiple smaller transfers of one or more data packets, the electrical power consumed by the communication module 120 to receive the data may be reduced.

An example follows. In some embodiments, a data transfer may involve transmitting some amount of data in a predetermined period. The data may be routed to the communication module 120 in piecewise fashion at varying intervals. If the communication module 120 receives the data in piecewise fashion, the communication module 120 may transmit the data in a piecewise fashion using multiple separate data transfers. In the system 100, if the shape of the data is altered before sending the data to the communication module 120 so that the communication module 120 may perform fewer data transfers, the electrical power consumed by the communication module 120 to transmit the data may be reduced.

Referring again to the example system 100 of FIG. 1, in some embodiments the management module 110 may be configured to receive data packet traffic that is being routed to the communication module 120 over a data line 112. In some embodiments, the data line 112 may be a physical data line. In other embodiments, the data line 112 may be a logical interface that carriers data between modules or within a module.

The management module 110 may also be configured to shape the received data packet traffic. In some embodiments, the management module 110 may shape the data packet traffic by adjusting the timing of individual data packets. In some embodiments, the management module 110 may adjust the timing of individual data packets that are received at different times by the management module 110 so that the data packets are sent together to the communication module 120. The management module 110 may adjust the timing of the individual data packets by buffering the data packets. For example, the management module 110 may, upon receipt of individual data packets, place individual data packets into a queue and then after a predetermined time period send all of the data packets in the queue together to the communication module 120. The communication module 120 may transmit the individual data packets received together as a single data transfer.

The management module 110 may buffer the data packets to shape the data packet traffic and reduce the electrical power consumption of the communication module 120. Note that the communication module 120, in some embodiments, may have bandwidth available to transmit the data packets when they are received by the management module 110 and while the data packets are buffered by the management module 110. In these and other embodiments, the management module 110 may not buffer the data packet traffic because the communication module 120 is unable to transfer the data packets. For example, the management module 110 may not buffer the data packets because the communication module 120 does not have any electrical power or sufficient electrical power to transfer the data packets. Thus, the management module 110 may not be buffering data packets based on the bandwidth availability of the communication module 120.

Alternately or additionally, in some embodiments, the communication module 120 may not have bandwidth available to transmit data packets when they are received by the management module 110. In these and other embodiments, the communication module 120 may develop available bandwidth while the management module 110 is buffering data. The management module 110 may not send the buffered data to the communication module 120 as soon as bandwidth is available in the communication module 120. Thus, the management module 110 may not be buffering data packets based on the bandwidth availability of the communication module 120. Rather, the management module 110 may buffer the data packets to shape the data packet traffic and thereby reduce the electrical power consumption of the communication module 120.

Referring again to FIG. 1, in some embodiments, the management module 110 may contain a decision engine 114 that determines how to shape the data packet traffic. In determining how to shape the data packet traffic, the decision engine 114 may consider one or more power management factors. For example, in some embodiments, the decision engine 114 may consider power management factors, such as, a number of buffered data packets, a data packet latency rate of at least one of the data packets in the buffer, a period in which the communication module 120 is idle, an electrical power consumption setting of the system 100, a data transmission rate achievable by the communication module 120, a data processing rate for at least one of the data packets in the buffer, among other factors.

The communication module 120 may transmit data through any known data transmission medium using any known data transmission protocol or interface. For example, in some embodiments the communication module 120 may be a wireless radio configured to transmit data wirelessly using one or more wireless systems that may include modulated laser light systems, two way radio services, VHF radios, cellular telephone networks, BLUETOOTH, wireless USB, wireless networks, such as, wireless personal area networks, wireless local area networks, wireless mesh networks, wireless wide area networks, personal communication service, among others. Alternately or additionally, the communication module may transmit data over a wired network or over an optical network.

In some embodiments, the communication module 120 may be implemented, at least partially, in hardware, programmable devices, software, or some combination thereof. In some embodiments, the management module 110 may be implemented in hardware, programmable devices, software, or some combination thereof. Alternately or additionally, the communication module 120 and the management module 110 may be combined into a single module. Alternately or additionally, a device may generate the data that is provided over the data lines 112. For example, the device may be a mobile device, including but not limited to, a mobile phone, smart phone, tablet, laptop, PDA, gaming console, video player, or music player that runs one or more applications. The data provided over the data lines 112 may be data generated by the applications on the mobile device. In some embodiments, the device may route or pass data that is provided over the data lines 112. For example, the device may be a gateway, which may include but not be limited to, a router, Ethernet or WIFI access point, in-vehicle-infotainment system in a car, cellphone base station, server, or proxy server. In some embodiments, a system may include a device and a gateway that each include the system 100.

Figure 2:
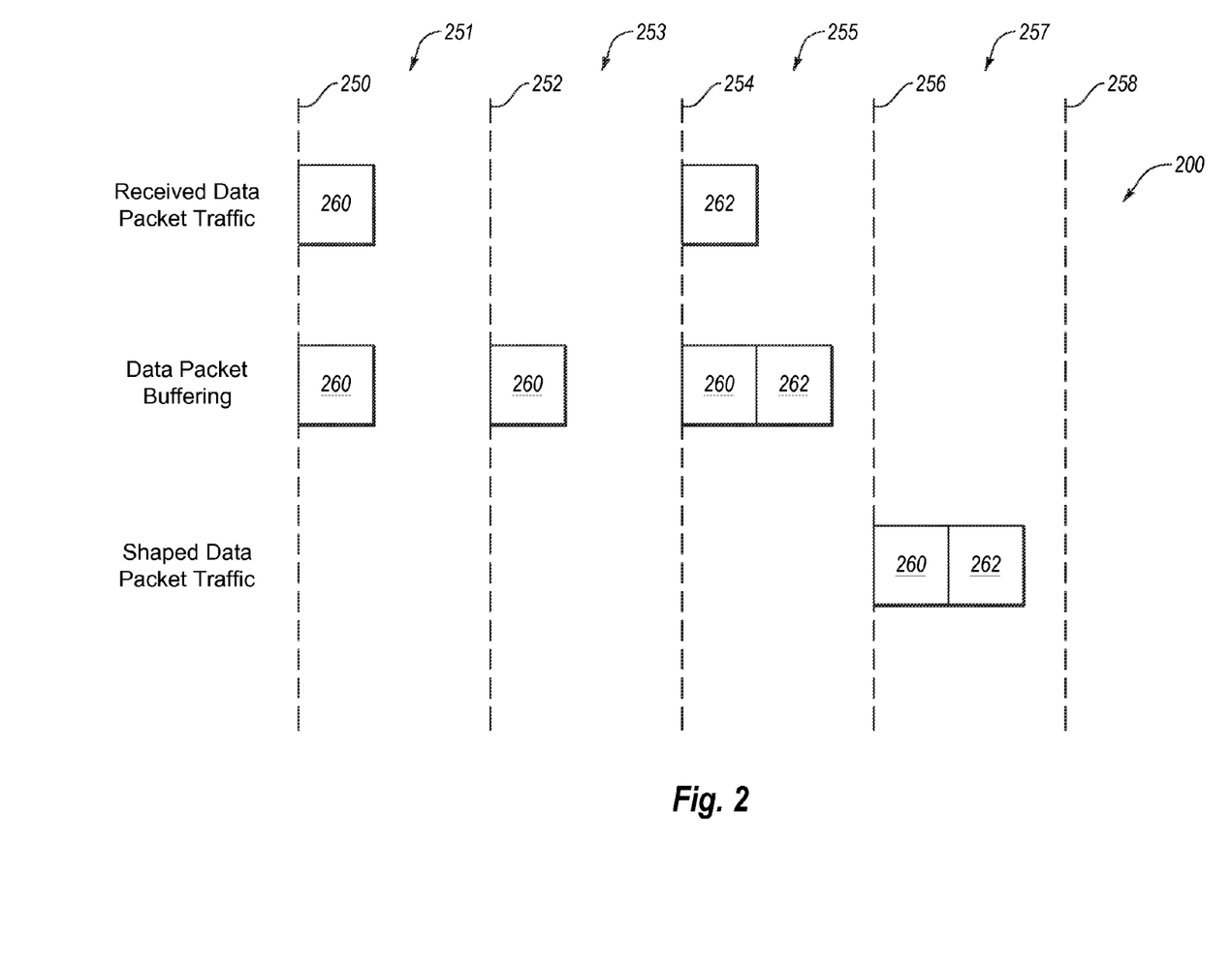
FIG. 2 illustrates an example timing diagram for shaping traffic data using the example system of FIG. 1, according to some embodiments.

FIG. 2 illustrates an example timing diagram 200 for shaping traffic data using the system 100 of FIG. 1, according to some embodiments. The example timing diagram 200 illustrates received data packet traffic, data packet buffering, and shaped data packet traffic at five different times 250, 252, 254, 256, 258 that create four associated time periods 251, 253, 255, 257. In particular, the timing diagram 200 illustrates first and second data packets 260, 262 and when the first and second data packets 260, 262 are associated with received data packet traffic, data packet buffering, and shaped data packet traffic at the five different times 250, 252, 254, 256, 258.

At time 250, the first data packet 260 may be initially associated with received data packet traffic and then transferred to data packet buffering. For example, in some embodiments, the first data packet 260 may be received by the management module 110 in route to the communication module 120. The management module 110 may buffer the first data packet 260 by placing the first data packet 260 into a buffering queue.

At time 252, the first data packet 260 remains associated with data packet buffering. At time 254, a second data packet 262 may be initially associated with received data packet traffic and then transferred to data packet buffering. For example, in some embodiments, the second data packet 262 may be received by the management module 110 in route to the communication module 120. The management module 110 may buffer the second data packet 262 by placing the second data packet 262 into the established buffering queue behind the first data packet 260.

At time 256, the first and second data packets 260, 262 may be shaped data packet traffic that is transmitted. For example, in some embodiments, the first and second data packets 260, 262 may be sent together by the management module 110 to the communication module 120, and then transmitted together by the communication module 120. The first and second data packets 260, 262 may be transmitted together at time 256 as a larger data transfer. In some embodiments, if the first and second data packets 260, 262 had not been buffered, smaller data transfers may have occurred at time 250 and time 254, respectively. In other embodiments, if the first and second data packets 260, 262 had not been buffered until time 256, smaller data transfers may have occurred at other times based on the availability of the communication module 120 and/or other factors.

Note that the timing diagram 200 is illustrative only and should not be limiting. In some embodiments, data packets may be buffered for more or less than four periods. Alternately or additionally, more than two data packets may be buffered at once and more than one data packet may be received during a single time period. Alternately or additionally, not all of the data packets being buffered may be sent to the communication module 120 at the same time. For example, in some embodiments, a portion of a data packet may be sent to the communication module 120. In other embodiments, depending on the size of the data packets, one or more data packets along with a portion of another data packet may be sent to the communication module 120.

Note that how the data packet traffic is shaped may not be based on the availability of the communication module 120, but rather on one or more power management factors. In some embodiments, one power management factor may be a data packet latency tolerance of at least one of the data packets in the buffer. The data packet latency tolerance for a data packet may depend on the data within the data packet. For example, in some embodiments, an application may have generated the first data packet 260 and routed the first data packet 260 to the communication module 120 for transmission. The application may have a real time requirement that indicates that the first data packet 260 may need to be transmitted within four time periods, which may be the data packet latency tolerance of the first data packet 260. Because the first data packet 260 is received by the management module 110 at time 250 during the time period 251, the first data packet 260 may be buffered until time 258, which may be the end of the time period 257.

In some embodiments, another power management factor may be a data transmission rate achievable by the communication module 120. For example, in some embodiments, the first data packet 260 may need to be transmitted within four time periods and the communication module 120 may require two time periods to transmit the first data packet 260, due to the size of the first data packet 260. In these and other embodiments, the first data packet 260 may only be buffered until time 254. At time 254, the first data packet 260 may be sent to the communication module 120 for transmission during the time periods 255, 257 to allow the first data packet 260 to be transmitted within the four time periods.

In some embodiments, another power management factor may be a data processing rate achievable by the management module 110 and other modules that pass the data packets to the management module 110 and the communication module 120. For example, in some embodiments, the longer a data packet may be processed, the shorter an associated buffer period may be for the data packet.

In some embodiments, another power management factor may be an electrical power consumption setting of the system 100. For example, in some embodiments, the system 100 may be set to not conserve electrical power. In these and other embodiments, the management module 110 may not buffer data packets or may not buffer data packets for as long as the data packets could be buffered. In other embodiments, the system 100 may be set to conserve electrical power. In these and other embodiments, the management module 110 may buffer data packets as long as possible to reduce the total number of transfers that occur.

In some embodiments, another power management factor may be a number of buffered data packets in a buffering queue. For example, in some embodiments, the management module 110 may only buffer as many data packets as may be transmitted within a certain period. Alternately or additionally, the management module may only buffer a certain predetermined number of data packets. Other conditions may affect the number of data packets that may be buffered.

In some embodiments, another power management factor may be a period during which the communication module 120 is idle. For example, the communication module 120 may need to send data packets within set intervals to adhere to communication protocols for a network to which the communication module 120 is connected.

In some embodiments, the decision engine 114 may use one or more of the above described power management factors or other power management factors in algorithms to determine a period to buffer data packets and how many data packets to buffer. For example, in some embodiments, the decision engine 114 may apply an algorithm that uses data packet latency tolerance as a factor. In these and other embodiments, the decision engine 114 may start a timer that indicates a data packet latency tolerance when the management module 110 receives a data packet and no data is currently being buffered. While the timer is counting down, the management module 110 may buffer all incoming data packets. Once the timer expires, the management module 110 may send all of the buffered data packets to the communication module 120. After receiving another data packet, the decision engine 114 may restart the timer, and in some circumstances, may change the settings for the timer based on the received data packet.

As another example, in some embodiments, the decision engine 114 may apply an algorithm that uses a data packet latency tolerance, a data processing rate, and a data transmission rate. In these and other embodiments, the decision engine 114 may start a timer that indicates a data packet latency tolerance when the management module 110 receives a data packet and no data is currently being buffered. Every time a data packet is received or when the first data packet in the queue is received, the decision engine 114 may determine whether the data processing rate or the data transmission rate is slower. Based on the slower of the data processing rate and the data transmission rate, the decision engine 114 may determine if a number of data packets being buffered is more than a number of data packets that may be processed during a period that is equal to the data packet latency tolerance of the data packets. If so, the management module 110 may send the amount of data packets that may be processed during a period, which is equal to the data packet latency tolerance, to the communication module 120 for transmission.

After sending data packets, the decision engine 114 may then reset the timer to a period that is equal to the data packet latency tolerance of one or more of the data packets being buffered. If a number of data packets being buffered never exceeds a maximum number of data packets that may be processed within the data packet latency tolerance of the data packets, the decision engine 114 may direct the management module 110 to send all of the buffered data packets to the communication module 120 after the timer expires. In some embodiments, the decision engine 114 may monitor the status of the data processing rate and the data transmission rate and update the values accordingly while data packets are being buffered. For example, the data transmission rate may be changed based on changing network conditions. Based on the updated data processing rate and data transmission rate, a number of data packets that may be processed during the data packet latency tolerance of the data packets may be changed and the decision engine 114 may proceed as indicated above.

Figure 3:
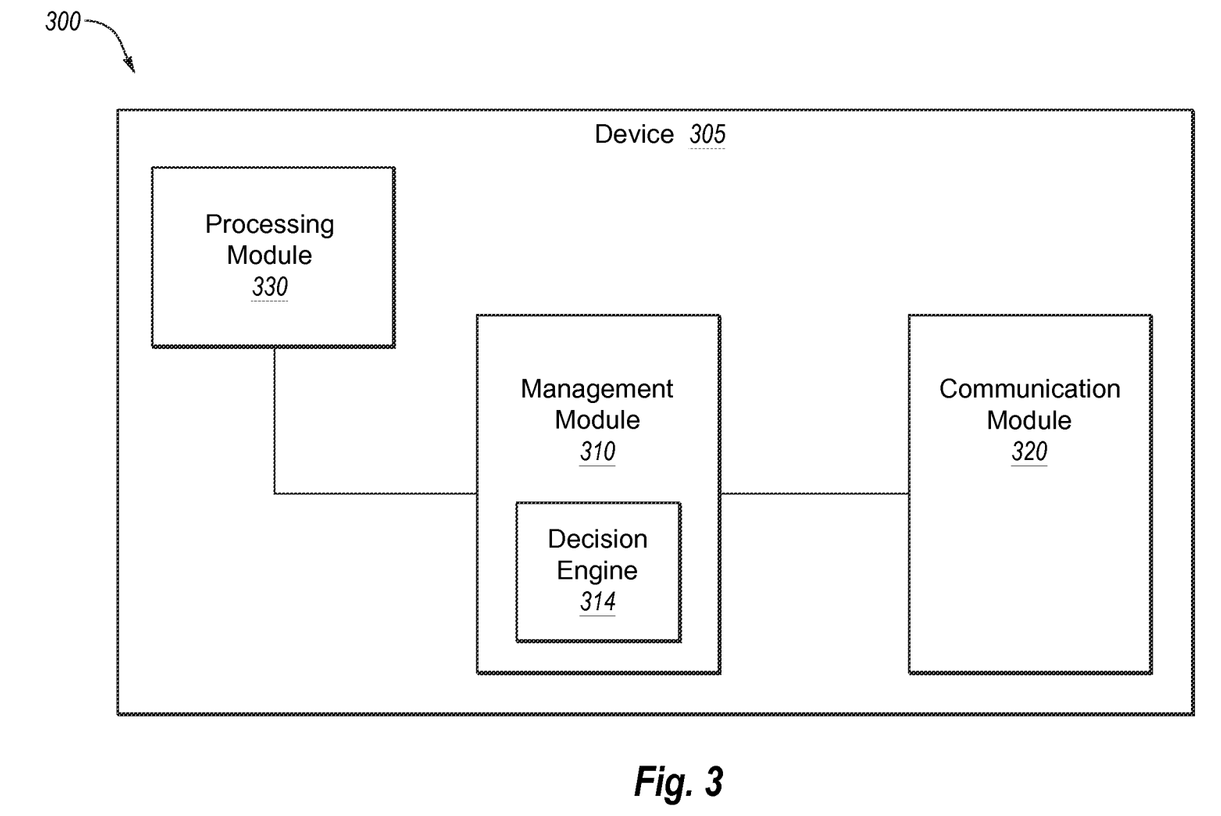
FIG. 3 is a block diagram of another example system, according to some embodiments.

FIG. 3 is a block diagram of another example system 300, according to some embodiments. The system 300 includes a device 305 that includes a processing module 330, a management module 310, and a communication module 320. The management module 310 is coupled to the processing module 330 and the communication module 320 and contains a decision engine 314. The management module 310, decision engine 314, and the communication module 320 may be similar to the management module 110, decision engine 114, and the communication module 120 of FIG. 1.

The device 305 may be any electronic device, including but not limited to, a mobile phone, smart phone, tablet, laptop, desktop, PDA, gaming console, video player, or music player. According to some embodiments, the device 305 may include a display port to be coupled to, for example, a computer monitor. The processing module 330 may run one or more applications that may generate data. The generated data may be routed through the management module 310 to the communication module 320. At the communication module 320, the data may be transmitted out of the device. The communication module 320 may transmit the data wirelessly, or over a wired or optical network. In some embodiments, the management module 310 may shape the data packet traffic routed to the communication module 320 based on one or more power management factors as described above to reduce the electrical power consumption of the device 305.

Figure 4:
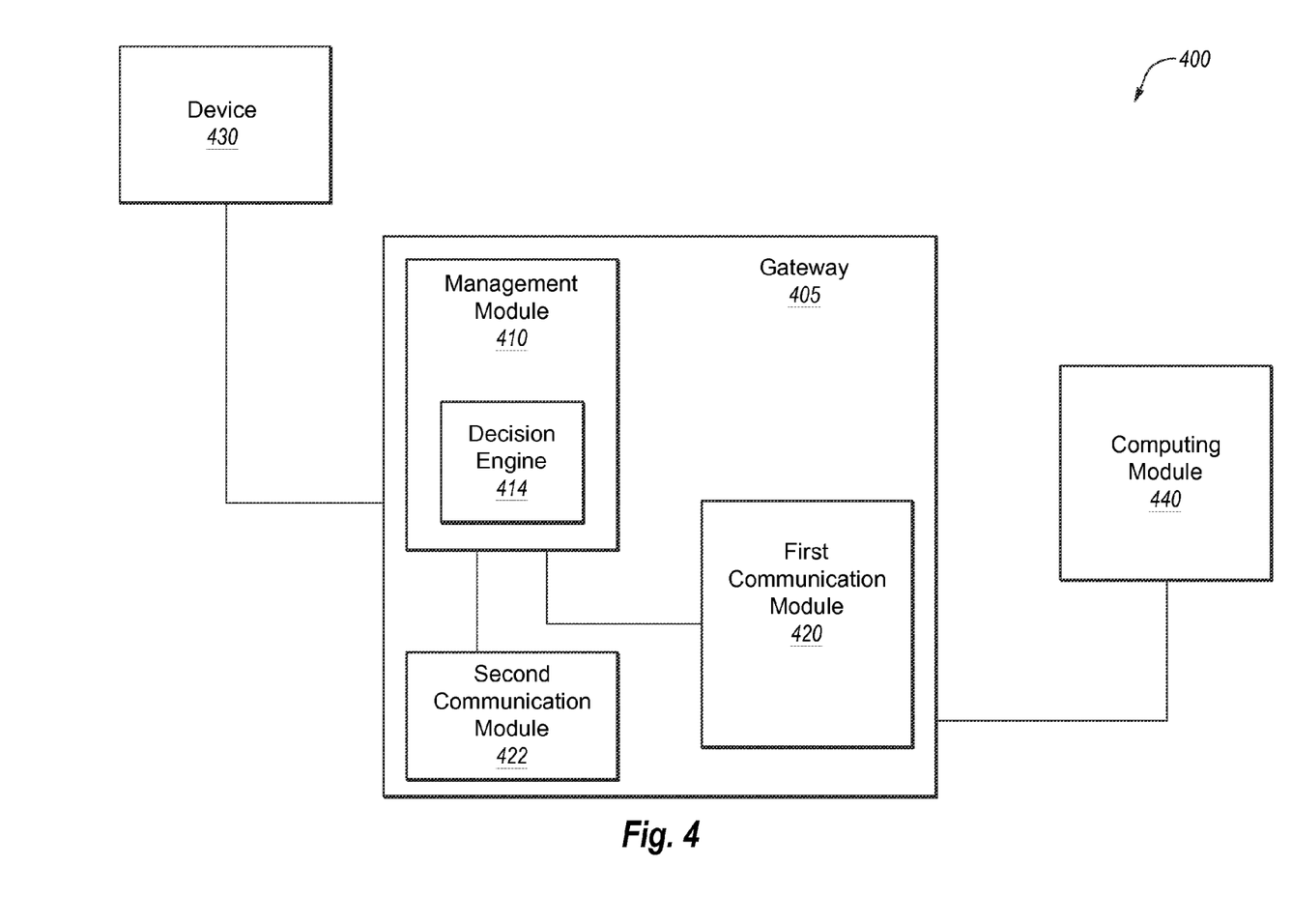
FIG. 4 is a block diagram of yet another example system, according to some embodiments.

FIG. 4 is a block diagram of another example system 400, according to some embodiments. The system 400 includes a gateway 405 coupled between a device 430 and a computing module 440. The gateway 405 may include a management module 410 with a decision engine 414 and a first and second communication module 420, 422. In some embodiments, the management module 410, decision engine 414, and the first and second communication modules 420, 422 may be similar to the management module 110, decision engine 114, and the communication module 120, respectively, of FIG. 1.

In some embodiments, the gateway 405 may handle data transfers between the device 430 and the computing module

440. In these and other embodiments, the management module 410 may receive data packets from either the device 430 or the computing module 440.

For example, in some embodiments, the device 430 may send data packets to the computing module 440 through the gateway 405. In these and other embodiments, the second communication module 422 may receive the data packets from the device 430. The second communication module 422 may route the data packets to the management module 410. In some embodiments, the management module 410 may contain a routing algorithm to determine where to route the data packets. Based on the routing algorithm, the management module 410 may route the received data packets to the first communication module 420 for transmission to the computing module 440. In some embodiments, the management module 410 may shape the data packet traffic routed to the first communication module 420 based on one or more power management factors. Shaping the data packet traffic may reduce the electrical power consumption of the gateway 405 because fewer data transmissions may be required. Shaping the data packet traffic may also reduce the electrical power consumption of the computing module 440 because fewer data receptions may be required. The decision engine 414 may use data from the device 430 or the computing module 440, such as a data processing rate, data transmission rate, electrical power consumption setting, data packet latency tolerance, and others, to determine how to shape the data packet traffic.

As another example, in some embodiments, the computing module 440 may send data packets to the device 430 through the gateway 405. The first communication module 420 may receive the data packets from the computing module 440. The first communication module 420 may route the data packets to the management module 410. In some embodiments, the management module 410 may contain a routing algorithm to determine where to route the data packets. Based on the routing algorithm, the management module 410 may route the received data packets to the second communication module 422 for transmission to the device 430. In some embodiments, the management module 410 may buffer the data packets to shape the data packet traffic routed to the second communication module 422 based on one or more power management factors. Shaping the data packet traffic may reduce the electrical power consumption of the gateway 405 because fewer data transmissions may be required. Shaping the data packet traffic may also reduce the electrical power consumption of the device 430 because fewer data receptions may be required. The decision engine 414 may use data from the device 430 or the computing module 440, such as a data processing rate, data transmission rate, electrical power consumption setting, data packet latency tolerance, and others, to determine how to shape the data packet traffic.

In some embodiments, the management module 410 within the gateway 405 may monitor the data packet traffic from the computing module 440 and the device 430. If the management module 410 determines that the data packet traffic originating from the computing module 440 or the device 430 is slow or stopped, the management module 410 may send a signal to the other of the computing module 440 or device 430 that the data packet traffic is slow or stopped. After receiving the indication of slow or stopped data packet traffic, the computing module 440 or the device 430 may enter into a low electrical power mode to conserve electrical power. In some embodiments, the computing module 440 or the device 430 entering into a low electrical power mode may include the computing module 440 or the device 430 reducing electrical power to one or more of its modules. In some embodiments, the gateway 405 may include a module other than the management module 410 that may monitor the data packet traffic and send a signal indicating lower data packet traffic.

In some embodiments, the device 430 and/or the computing module 440 may contain one or more modules to shape data packet traffic to reduce electrical power usage for the device 430 and/or computing module 440 when the device 430 and/or computing module 440 transmit data. In some embodiments, the device 430 may be any electronic device, including but not limited to, a mobile phone, smart phone, tablet, laptop, desktop, PDA, gaming console, video player, or music player. In some embodiments, the gateway 405 may include but not be limited to, a router, Ethernet or WIFI access point, in-vehicle-infotainment system in a car, cellphone base station, server, or proxy server. In some embodiments, the computing module 440 may include but not be limited to, a server, proxy server, processor, desktop computer, laptop computer, or other electronic device that generates and receives data.

Figure 5:
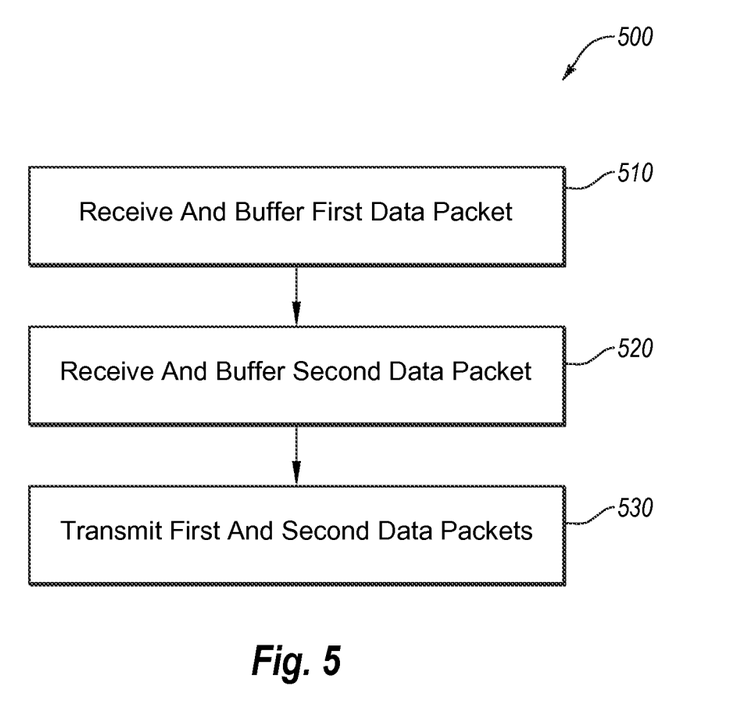
FIG. 5 is a flow chart of an example method, according to some embodiments.

FIG. 5 is a flow chart of an example method 500 according to some embodiments. The method 500 may be performed, for example, by the system 100 of FIG. 1. The flow charts described herein do not necessarily imply a fixed order to the actions, and embodiments may be performed in any order that is practicable. Note that any of the methods described herein may be performed by hardware, software (including firmware or microcode), or a combination of hardware and software. For example, a storage medium may store thereon instructions that when executed by a machine result in performance according to any of the embodiments described herein.

At 510, a first data packet is received and buffered. The first data packet may be received in route to a communication module that may transmit the first data packet. A period in which the first data packet is buffered may be based on one or more power management factors. In some embodiments, the communication module may include bandwidth to transmit the first data packet when the first data packet is received and buffered.

At 520, a second data packet is received and buffered. The second data packet may be received in route to a communication module that may transmit the second data packet. The second data packet may be received after the reception of the first data packet. A period in which the second data packet is buffered may be based on one or more power management factors. In some embodiments, the power management factor used to determine the period to buffer the second data packet may be the same or different than the power management factor used to determine the period to buffer the first data packet. In some embodiments, the communication module may include bandwidth to transmit the first and second data packets when the second data packet is received and buffered.

At 530, at least a portion of the first and second data packets may be transmitted using the communication module. For example, in some embodiments, a portion of the first data packet may be transmitted separately from the remaining portion of the first data packet and the second data packet. In other embodiments, the first and second data packets may be transmitted together. In some embodiments, the first and second data packets may be wirelessly transmitted by the communication module.

In some embodiments, the method 500 may be performed to shape data packet traffic by buffering the first and second data packets based on one or more power management factors, to thereby reduce the electrical power consumption of a device that includes the communication module. In some embodiments, the method 500 may buffer the first and second data packets by placing the first and second data packets into a queue.

In some embodiments, the power management factor(s) may include a data packet latency tolerance of at least one of the first and second data packets. Alternately or additionally, the power management factor(s) may include a data transmission rate at which the first and second packets are transmitted. Alternately or additionally, the power management factor(s) may include a number of buffered data packets, the period in which the communication module is idle, a data processing rate, or an electrical power consumption setting.

In some embodiments, the method 500 may include additional actions. For example, in some embodiments, the method 500 may include receiving and buffering a third data packet routed to the communication module for transmission of the third data packet. The third data packet may be received after the reception of the first and second data packets. A period in which the third data packet is buffered may be based on one or more power management factors. In some embodiments, the communication module may include bandwidth to transmit the first, second, and third data packets when the third data packet is received and buffered. The first data packet, second data packet, and third data packet may be transmitted together using the communication module. In some embodiments, additional data packets may be received, buffered, and transmitted together with the first, second, and third data packets. Alternately or additionally, one or more partial data packets may be transmitted together.

Although particular system, hardware, and interface configurations have been described herein, embodiments may be performed with any other types of system, hardware, and/or interface configurations. Similarly, although specific methods have been described, any number of other types of methods might be performed in connection with embodiments described here.

The several embodiments described herein are solely for the purpose of illustration. Persons skilled in the art will recognize from this description that other embodiments may be practiced with modifications and alterations limited only by the claims.

What is claimed is:

1. An apparatus for reducing electrical power consumption associated with data packet traffic, the apparatus comprising:
    a communication module configured to transmit data packet traffic; and
    a management module configured to reduce electrical power consumption by shaping the data packet traffic to be transmitted by the communication module to:
    buffer data packets routed at different times to the communication module based on determining a transmit time period that is based on (i) a data processing rate, (ii) a latency tolerance defined as a number of time periods within which a first of the data packets needs to be transmitted, and (iii) a data transmission rate, and
    send buffered data packets to the communication module for transmission of the buffered data packets by the communication module within the determined transmit time period; and
    a decision engine to (i) determine a time period to buffer data packets based on the latency tolerance and the size of the first of the data packets, (ii) determine whether the data processing rate or the data transmission rate is slower each time a data packet is received or when a first data packet in a queue is received, (iii) based on the slower of the data processing rate and the data transmission rate, determine if a number of data packets being buffered is greater than a number of data packets that may be processed during a period that is equal to the latency tolerance, (iv) set a timer to the period equal to the data packet latency tolerance, and (v) start the timer when the management module receives a data packet and no data is currently being buffered wherein the management module buffers incoming data packets while the timer counts down and sends the buffered data packets to the communication module after the timer expires.

2. The apparatus of claim 1, wherein the communication module is a wireless radio configured to wirelessly transmit the shaped data packet traffic.

3. The apparatus of claim 1, wherein the communication module is to have available bandwidth to transmit the data packets while the data packets are buffered by the management module.

4. The apparatus of claim 1, wherein at least one power management factor includes at least one of: a number of buffered data packets, a period in which the communication module is idle, a data processing rate, and an electrical power consumption setting.

5. The apparatus of claim 1, wherein the at least one power management factor is a data transmission rate of the communication module.

6. The apparatus of claim 1, wherein the communication module and management module are associated with a mobile device.

7. The mobile device of claim 6, wherein the mobile device comprises a processing module configured to run an application that is to generate the data packets for transmission by the communication module, the processing module to route the data packets to the communication module.

8. A gateway comprising the apparatus of claim 1, wherein the gateway is to handle routing of the data packets between a device and a computing module.

9. The gateway of claim 8, wherein the gateway is to receive the data packets from the computing module and route the data packets to the communication module.

10. The gateway of claim 8, wherein the computing module is a server.

11. An apparatus for reducing electrical power consumption associated with data packet traffic, the apparatus comprising:
    a gateway configured to manage communications between a device and a computing module, the gateway comprising:
    a communication module configured to transmit data packets to the device; and
    a management module configured to reduce electrical power consumption by sending a signal to the device to indicate a level of data packet traffic from the computing module, wherein the management module is further configured to shape data packet traffic configured to transmit to the device by the communication module to:
    buffer the data packets routed at different times to the communication module by the computing module based on determining a transmit time period that is based on (i) a data processing rate, (ii) a latency tolerance defined as a number of time periods within which a first of the data packets needs to be transmitted, and (iii) a data transmission rate, and
    send buffered data packets together to the communication module for transmission of the buffered data packets to the device within the determined transmit time period; and
    a decision engine to (i) determine a time period to buffer data packets based on the latency tolerance and the size of the first of the data packets, (ii) determine whether the data processing rate or the data transmission rate is slower each time a data packet is received or when a first data packet in a queue is received, (iii) based on the slower of the data processing rate and the data transmission rate, determine if a number of data packets being buffered is greater than a number of data packets that may be processed during a period that is equal to the latency tolerance wherein in a case that the number of data packets being buffered is greater than a number of data packets that may be processed during a period that is equal to the latency tolerance, the management module sends the amount of data packets that may be processed during a period equal to the data packet latency tolerance to the communication module for transmission, (iv) set a timer to the period equal to the data packet latency tolerance, and (v) start the timer when the management module receives a data packet and no data is currently being buffered wherein the management module buffers incoming data packets while the timer counts down and sends the buffered data packets to the communication module after the timer expires.

12. The system of claim 11, wherein the computing module is a server.

13. The system of claim 11, wherein when the signal indicates no data packet traffic from the computing module, the device is to enter a low electrical power mode.

14. A method for reducing electrical power consumption associated with data packet traffic, the method comprising:
- receiving and buffering a first data packet routed to a communication module for transmission of the first data packet;
- receiving and buffering a second data packet routed to the communication module for transmission of the second data packet, the second data packet received after reception of the first data packet;
- determine a period to buffer and transmit the first and second data packets based on determining a transmit time period that is based on (i) a data processing rate, (ii) a latency tolerance defined as a number of time periods within which a first of the data packets needs to be transmitted, and (iii) a data transmission rate;
- determining a time period to buffer data packets based on the latency tolerance and the size of the first of the data packets;
- determining whether the data processing rate or the data transmission rate is slower each time a data packet is received or when a first data packet in a queue is received;
- based on the slower of the data processing rate and the data transmission rate, determining if a number of data packets being buffered is greater than a number of data packets that may be processed during a period that is equal to the latency tolerance;
- setting a timer to the period equal to the data packet latency tolerance; and
- starting the timer when a data packet is received and no data is currently being buffered wherein the incoming data packets are buffered while the timer counts down and are sent to the communication module after the timer expires; and
- transmitting at least a portion of the first and second data packets using the communication module.

15. The method of claim 14, wherein the at least one power management factor is a data transmission rate at which the first and second packets are transmitted.

16. The method of claim 14, further comprising receiving and buffering a third data packet routed to the communication module for transmission of the third data packet, the third data packet received after reception of the first and second data packets, wherein a period to buffer the third data packet is based on at least one power management factor.

17. The method of claim 16, wherein the first, second, and third data packets are wirelessly transmitted by the communication module.

* * * * *